(12) United States Patent
Quirk et al.

(10) Patent No.: US 7,235,615 B2
(45) Date of Patent: Jun. 26, 2007

(54) SYNTHETIC POLYMERS WITH HIGHLY-FUNCTIONALIZED LIQUID-RUBBER CHAIN-END MOIETIES

(75) Inventors: Roderic P. Quirk, Akron, OH (US); Jin-Ping Zhou, Hudson, OH (US)

(73) Assignee: The University of Akron, Akron, OH (US)

( * ) Notice: Subject to any disclaimer, the term of this patent is extended or adjusted under 35 U.S.C. 154(b) by 386 days.

(21) Appl. No.: 10/782,432

(22) Filed: Feb. 18, 2004

(65) Prior Publication Data

US 2004/0236167 A1 Nov. 25, 2004

Related U.S. Application Data

(63) Continuation-in-part of application No. 10/634,534, filed on Aug. 5, 2003, now abandoned.

(51) Int. Cl.
*C08F 4/48* (2006.01)
*C08F 36/06* (2006.01)

(52) U.S. Cl. .................. 526/123.1; 526/332; 526/335; 526/347

(58) Field of Classification Search .............. 526/335, 526/123.1, 332, 347
See application file for complete search history.

(56) References Cited

U.S. PATENT DOCUMENTS

| 3,971,743 A | 7/1976 | Breslow .................. 260/3.3 |
| 4,708,996 A | 11/1987 | Hoffman et al. ............ 525/530 |
| 5,310,819 A | 5/1994 | Roland et al. .............. 525/385 |
| 5,412,040 A | 5/1995 | Custro et al. ............ 525/332.9 |
| 5,491,197 A | 2/1996 | Custro et al. ............ 525/332.8 |
| 5,698,637 A | 12/1997 | Äärilä ...................... 525/285 |
| 5,747,598 A | 5/1998 | Coolbaugh et al. ......... 525/314 |
| 5,773,524 A | 6/1998 | Coolbaugh et al. ...... 525/332.8 |

OTHER PUBLICATIONS

Jin-Ping Zhou, "Liquid Rubber: Synthesis and Application" date: Apr. 11, 2002.*

"Liquid Rubber: Synthesis and Application", Jin-Ping Zhou, Department of Polymer Science, The University of Akron, OH 44325-3909, Apr. 11, 2002.

* cited by examiner

*Primary Examiner*—Robert D. Harlan
(74) *Attorney, Agent, or Firm*—Roetzel & Andress; George W. Moxon, II

(57) ABSTRACT

A method is provided for synthesizing a polymer that has highly-functionalized chain-end moieties. The method functionalizes liquid rubber to terminate a metallic or organometallic initiated living polymer. After the living polymer has been terminated with the functionalized liquid rubber, the functionalities on the residue of the liquid rubber are preferably modified to yield more advantageous functionalities.

8 Claims, 5 Drawing Sheets

SYNTHETIC POLYMERS WITH HIGHLY-FUNCTIONALIZED LIQUID-RUBBER CHAIN-END MOIETIES

This application is a continuation-in-part of U.S. application Ser. No. 10/634,534 filed on Aug. 5, 2003 now abandoned.

TECHNICAL FIELD

This invention relates to synthetic polymers with highly-functionalized liquid-rubber chain-end moieties and a method for synthesizing such polymers.

BACKGROUND OF THE INVENTION

Liquid rubbers are not a new class of materials: they are low molecular weight elastomers. Liquid rubbers can be prepared by a variety of polymerization mechanisms involving anionic, cationic, coordination, or free radical initiator systems and also by depolymerization of a high-molecular-weight polymer. Typical liquid rubbers have $M_n$ of about 1,000 to about 10,000.

For a liquid diene rubber, e.g. liquid polybutadiene rubber (BR), a high level of unsaturation is present. Thus, it can be chemically modified in a variety of ways. The microstructure, molecular weight, and architecture of the liquid BR can affect its reactivity to certain types of chemical modification, the ability to introduce functional groups into the polymer, and potential application. In terms of commercial significance, maleinization, epoxidation, chlorination, and hydrosilation are probably the most important reactions.

Conventional techniques for terminating and thereby end functionalizing living polymers generally produce a single functional group per polymeric-chain end. And polymers with a limited number of chain-end functionalities are problematic in applications that are better served by polymers having chain ends with multiple functionalities. For instance, applications such as surface modification, coating and painting, adhesives, additives for polymer blends, and dispersing aids for fillers are better served by polymers having multiple functionalities per chain end. There is therefore a need in the art to provide polymers with chain-end moieties having multiple functional groups as well as a method for synthesizing such polymers.

SUMMARY OF INVENTION

The present invention provides a method comprising the steps of: providing a liquid rubber that has multiple sites of unsaturation; chemically modifying the liquid rubber's sites of unsaturation to yield alternate functionalities and thereby create a functionalized liquid rubber; and terminating a metallic or organometallic-initiated living polymer with the functionalized liquid rubber.

The present invention provides a synthetic polymer with at least one highly-functionalized liquid-rubber chain-end moiety.

Additionally, the present invention provides A star polymer comprising a highly-functionalized liquid-rubber core and at least one polymeric arm prepared by anionic polymerization.

DETAILED DESCRIPTION OF THE INVENTION

Figure 1:
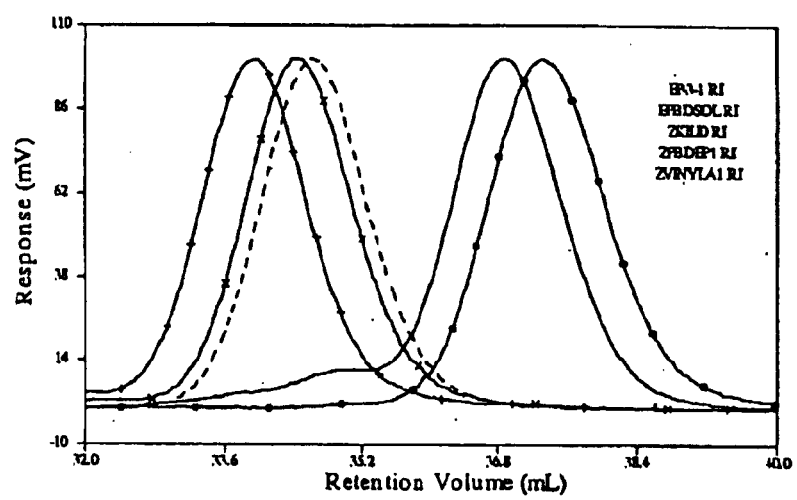
FIG. 1 is a size-exclusion chromatograph (SEC) of high vinyl (HV) liquid butadiene rubber (BR) (O), epoxidized HV liquid BR (—), polybutadienyllithium (- - -), PBD-Li/EP-BR(1/1 ratio) (X) and PBD-Li/EP-BR(3/1 ratio) (+).

Synthetic polymers having a large number of functional groups per polymeric-chain end can be produced by practicing the present method. Specifically, a method is presented that comprises the steps of: providing a liquid rubber that has multiple sites of unsaturation, chemically modifying these sites of unsaturation to yield epoxide or maleic anhydride functionalities, and terminating a metallic or organometallic initiated living polymer with the functionalized liquid rubber. Additionally, the epoxide or maleic anhydride functionalities of the functionalized liquid-rubber residue can then be chemically modified via hydrolysis to yield hydroxy or carboxy functionalities.

The present method first requires providing a liquid-rubber having multiple sites of unsaturation, and the preferred liquid-rubber is polybutadiene rubber (BR). Nonlimiting examples of employable liquid-rubbers include those having $M_n$ from about 1,000 to about 50,000. Preferably, the liquid-rubbers have $M_n$ ranging from about 1,000 to about 12,000. More preferably, the liquid-rubbers have $M_n$ ranging from about 1,000 to about 6,000.

If synthesis is required in order to provide a liquid-rubber having multiple sites of unsaturation, then any multi-ene monomer can be employed in synthesizing the liquid rubber. Conjugated diene monomers and preferably 1,3 diene monomers are employed in synthesizing liquid rubbers.

In one embodiment the present invention employs liquid rubbers synthesized using at least one conjugated diene monomer. In another embodiment, the present invention employs liquid rubbers synthesized using at least one conjugated diene monomer and at least one anionically polymerizable monomer comprising vinylic functionality.

Employable liquid rubbers are either linear or branched.

Methods for synthesizing liquid-rubbers such as polybutadiene, polystyrene, and polyisoprene are well known. Liquid rubbers can be prepared by a variety of polymerization mechanisms involving anionic, cationic, coordination, or free-radical initiator systems and also by depolymerization of a high-molecular-weight polymer. A nonlimiting example of a such a method employs sec-butyllithium as an anionic polymerization initiator, and n,n-dipiperidine ethane as a modifier in polymerizing butadiene monomer. After polymerization, the resulting liquid rubber can be isolated by precipitating it into methanol and then drying the solution under vacuum.

The molecular weight of a synthetic liquid rubber can readily be controlled by using well-known synthetic techniques. Molecular weights described herein are number-average molecular weights ($M_n$). $M_n$ of liquid-rubbers that can be employed in the present invention range from about 1,000 to about 50,000. Preferably, they range from about 1,000 to about 12,000. And more preferably, they range from about 1,000 to about 6,000.

When polybutadiene is the liquid-rubber that is employed, its vinylic functionalities can make up from about 5% to about 100% weight of the liquid-rubber. Preferably, the vinylic functionalities make up from about 10% to about 90% weight of the liquid-rubber.

A liquid-rubber employable in the present invention has at least three sites of unsaturation.

Liquid-rubbers that are employable in the present invention are preferably aliphatic.

Employable liquid-rubbers preferably have multiple sites of unsaturation that can be chemically modified to yield different functional groups by using conventional techniques. Preferably, a liquid rubber's sites of unsaturation are initially modified to epoxide or maleic anhydride functional groups. In another embodiment, hydrosilation is employed to yield alkoxysilane functional groups.

Epoxidation of an olefin can be carried out by employing a variety of reagents in a variety of different solvents. However, the choice of epoxidation is limited for polymeric materials due to solubility of the polymers, the side reactions of polymer chains and functional groups, and the reactivity of the carbon-carbon bonds in the polymer chains. There are three methods that are used most commonly, and they are illustrated in Scheme 3. Route 3 with dimethyldioxirane (DMD) works with substituted olefins only, i.e., the vinylic repeat units will not epoxidize (E2=0). Route 2 with peracetic acid will epoxidize 1,4-units preferentially (E2<<E4). Route 1 with m-chloroperoxybenzoic acid (MCPBA) in dry toluene seems most effective for both 1,4- and 1,2-adducts.

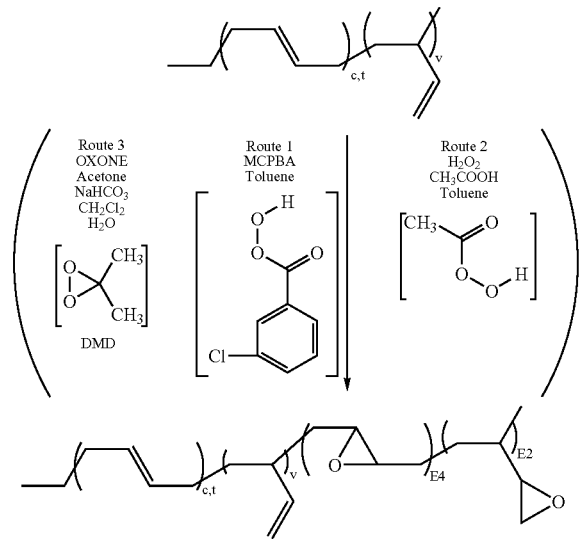

where v represents a vinylic functionality;
where c,t represents both cis and trans geometric isomers; and
where E2 represents an epoxidized vinylic functionality; and
where E4 represents an epoxidized in-chain site of unsaturation.

A nonlimiting example of epoxidizing a liquid rubber's sites of unsaturation via route 1 involves dissolving polybutadiene in dry toluene (5% weight/volume) to thereby create a first solution. A second solution is prepared by dissolving MCPBA in toluene and this solution is then dried with sodium sulfate. The peracid to double bond ratio between the two solutions is approximately 1.1 to 1. The two solutions are combined and allowed to react for 12 hours. The resulting polymeric solution can then be concentrated, precipitated into hexane, and dried. The degree of epoxidation of the polymer's sites of unsaturation is approximately 90% as determined by $^1$H-NMR.

Liquid BR with maleic anhydride functionalities can be purchased commercially or produced using the following well-known reaction scheme:

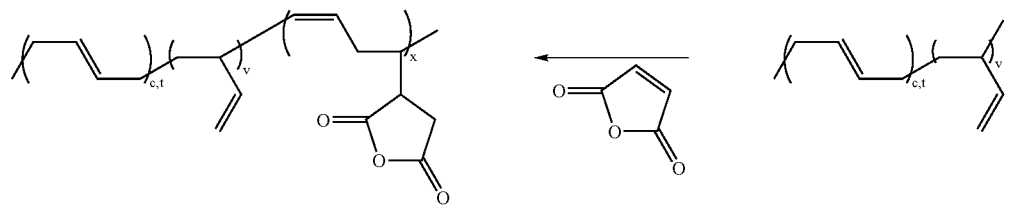

where v represents a vinylic functionality;
where c,t represents both cis and trans geometric isomers; and
where x represents a polymeric unit functionalized with maleic anhydride.

Liquid rubber can be functionalized to have many maleic anhydride functionalities. Perferably, the liquid rubber has at least 2 maleic anhydride functionalities. More preferably, the liquid rubber has from about 2 to about 60 maleic anhydride functionalities.

An additional step in synthesizing polymers with highly-functionalized liquid-rubber chain-end moieties involves terminating a metallic or organometallic initiated living polymer with a liquid rubber that preferably has many epoxide or maleic anhydride functionalities. It is well known that alkyllithium reacts with epoxide and maleic anhydride groups in a quantitative fashion. This, therefore, provides a means for terminating alkyllithium-initiated vinyl polymers. On top of that, using star-branched liquid BR can produce polymers with chain-end moieties having dendrimer-like architecture. Although any metallic or organometallic initiated living polymer can be employed, poly(styryl)lithium or poly(butadienyl)lithium is preferred.

To effect termination of the metallic or organometallic initiated living polymer, it is added to a solution comprising the functionalized liquid-rubber. The solvent is preferably toluene, although other conventional solvents in which a functionalized polymer is soluble can be employed by persons of ordinary skill in the art without undue experimentation.

The reaction between the living polymer and the functionalized liquid-rubber is allowed to proceed under standard conditions and for approximately 0.1 to about 2 hours, and more preferably from about 0.5 to about 1.0 hours. Persons having ordinary skill in the art will be able to readily determine the time required for reaction without undue experimentation. The reaction product is then isolated fractionated and dried using conventional techniques.

Where a metallic or organometallic initiated living polymer has been terminated with a highly functionalized liquid rubber as described hereinabove, an additional step may be performed to further modify a liquid rubber's epoxide or maleic anhydride functionalities as desired. For instance, epoxide functional groups can be modified to yield hydroxy groups or amino alcohols by using conventional techniques.

A nonlimiting example of a well known technique used for hydrolysis of epoxide functional groups involves dissolving an epoxidized polymer, which is preferably expoxidized BR, in an organic solvent, which is preferably THF (tetrahydrofuran), with adequate amounts of liquid water that can readily be determined by parties of ordinary skill in the art. The amount of epoxidized polymer that can be dissolved in THF ranges from about 5% to about 20% by weight of solution. Preferably, the amount of epoxidized polymer that is dissolved in THF is about 10% by weight of solution. Persons having ordinary skill in the art will be able to determine the amount of epoxidized polymer to be dissolved in solution without undue experimentation.

Additionally, the amount of water added to the solution of epoxidized liquid rubber in THF can generally be about 10% by weight of solution. Parties having ordinary skill in the art will be able to determine amounts of water to be employed without undue experimentation.

Bismuth chloride is preferably added to the solution as a catalyst, and other conventional hydrolysis catalysts can be employed. The reaction mixture is then heated at a temperature that will induce reflux for a time lasting approximately 4 hours. The resulting solution is then concentrated and precipitated in water. After isolating the polymer using conventional drying techniques, analysis should confirm from about 40% of the epoxide functionalities were converted to hydroxy groups. Analysis of the functional groups can be performed by using conventional techniques such as proton NMR. Persons having ordinary skill in the art will be able to optimize reaction conditions in order to yield maximum hydrolysis of epoxide functionalities.

An exemplary reaction scheme for synthesizing polystyrene that is end functionalized with liquid rubber having hydrolyzed epoxy functionalities is presented:

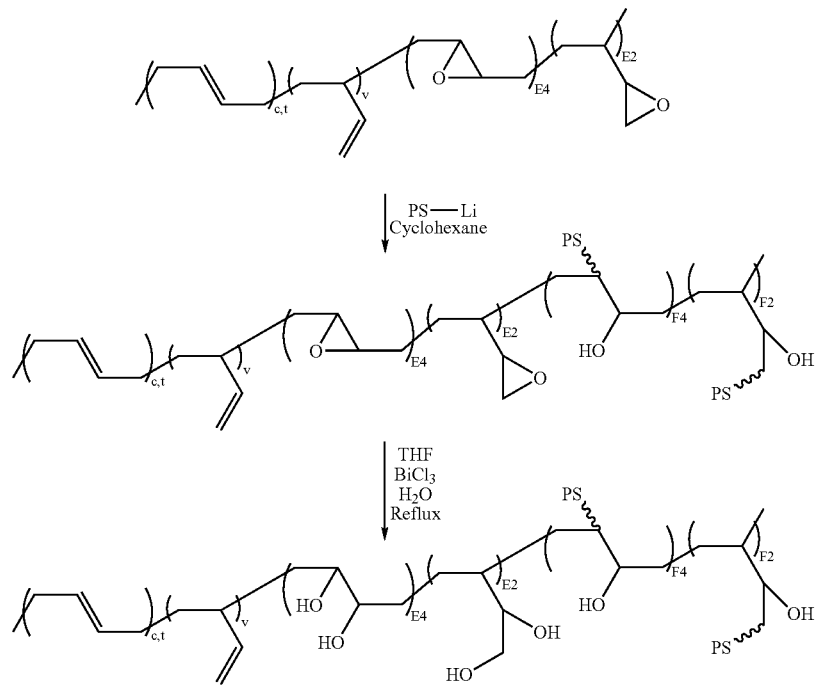

An exemplary reaction scheme for synthesizing polystyrene that is end functionalized with star-branched liquid BR having hydrolyzed functionalities is presented:

Scheme 6:
Functionalization of PS—Li with epoxidized star-branched liquid BR

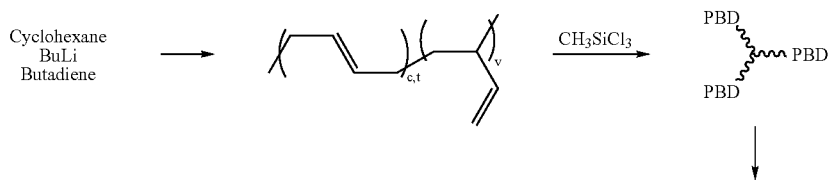

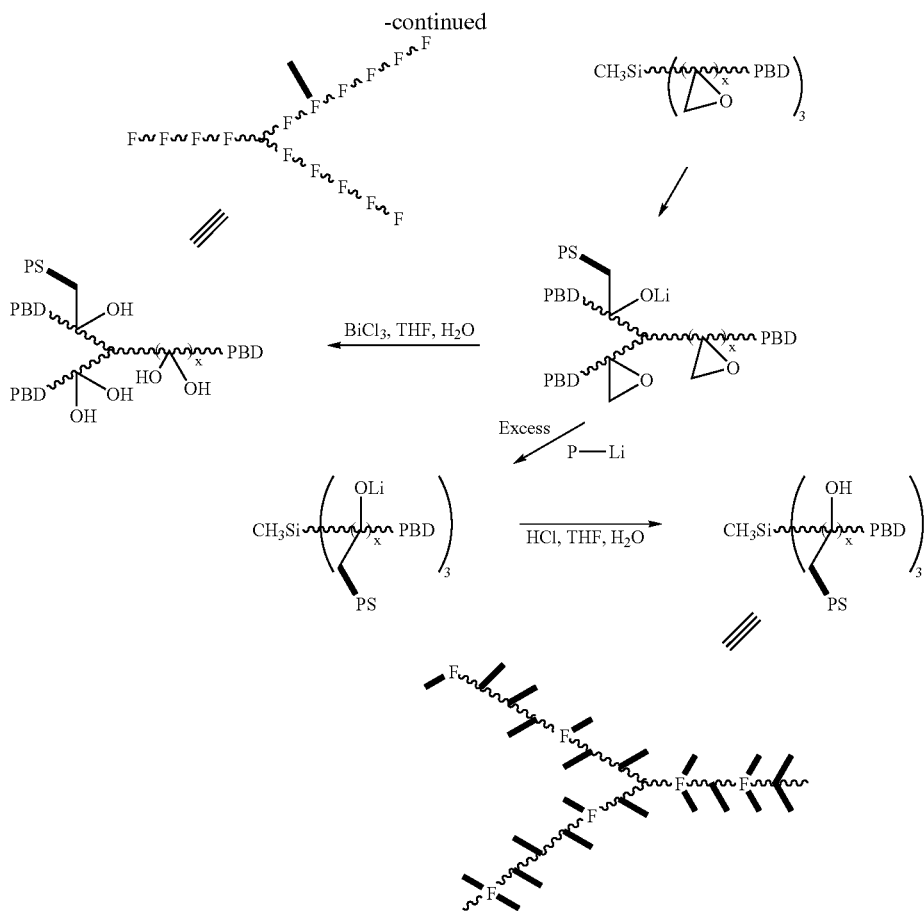

F: Functional groups
〰 Polybutadiene
▬ Polystyrene

A well-known reaction scheme for the hydrolysis of maleic anhydride functionalities in order to yield hydroxy functionalities is presented:

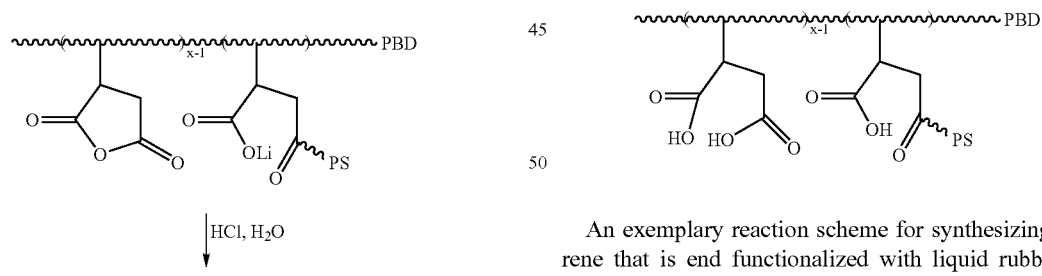

An exemplary reaction scheme for synthesizing polystyrene that is end functionalized with liquid rubber having hydrolyzed maleic anhydride groups is presented:

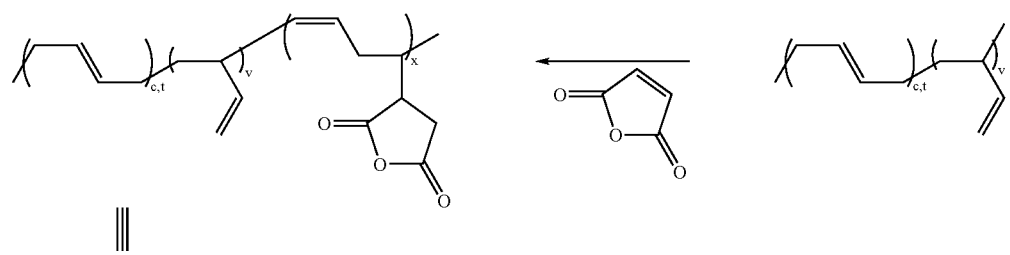

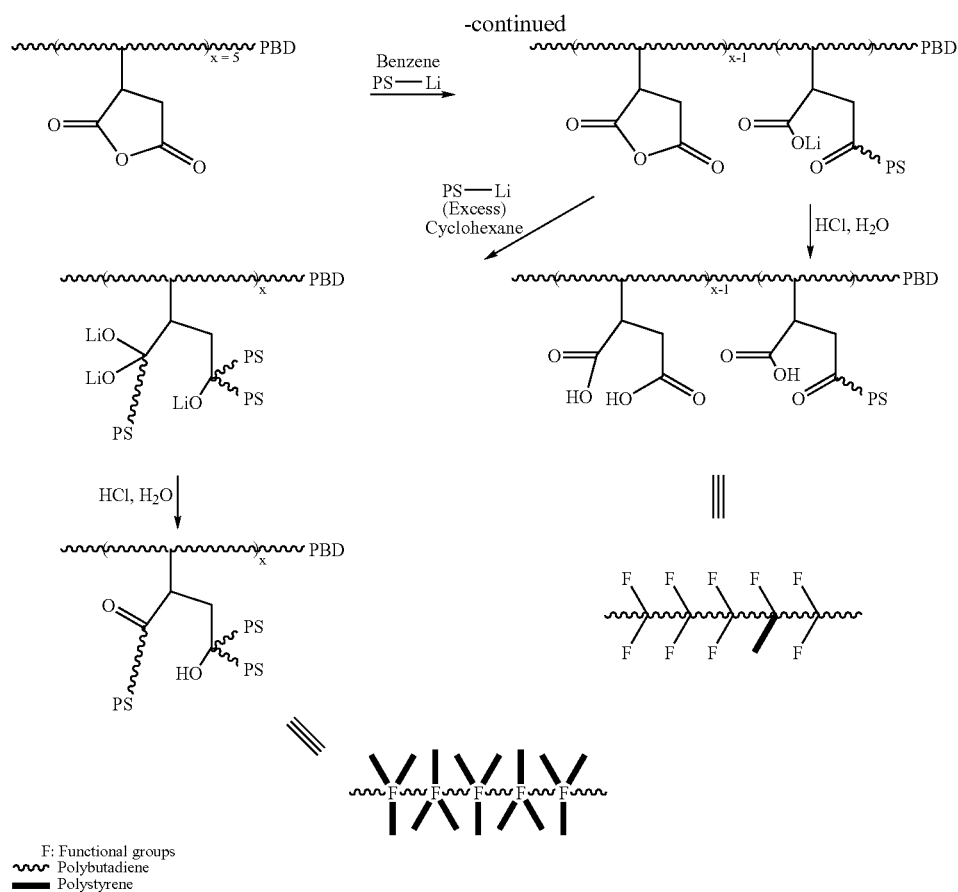

F: Functional groups
~~~ Polybutadiene
■■■ Polystyrene

Liquid BR can be synthesized by anionic mechanism to yield different microstucture and architectures. Further functionalization of those liquid BR, such as maleinization and epoxidation, provides more necessarily reactive functional groups for new applications. More interestingly, functionalization of living polymer chain ends, such as polystyryllithium and polybutadienyllithium, with those functionalized liquid BR can produce new polymers with a large number of functionalities and star polymers with different number of arms and functional cores. Star polymers of the present invention generally have liquid rubber cores and a number of arms that is greater than or equal to one. These new class polymers are relatively easy to synthesize and have a large number of functional groups and a similarity of architecture with dendrimer or hyperbrached polymers.

In order to demonstrate the practice of the present invention, the following examples have been prepared and tested. The examples should not, however, be viewed as limiting the scope of the invention. The claims will serve to define the invention.

GENERAL EXPERIMENTATION

Example 1

Synthesizing Liquid BR

Cyclohexane (Fisher, regent grade) and butadiene (Matheson gas, instrumental grade) was purified under high vacuum condition by standard methods as known in the art. Bispiperidinoethane (DIPIP) (Aldrich, 99%) was stirred over freshly ground calcium hydride (Alfa, 95%) with occasional degassing on the vacuum line for two days. After this period, the amine was distilled into another flask containing a few small pieces of sodium chunks (Fisher), using short-path distillation technique. Then desired amount of DIPIP was distilled into a ampoule equipped with a break-seal and sealed off from high vacuum line after addition of small amount of purified cyclohaxane.

A glass reactor was assembled and attached to high vacuum line. The reactor was evacuated overnight. After addition of sec-butyllithium initiator (6.0 mL, 1.53 M) and 600 mL of cyclohexane the reactor was sealed off from the line, and the reactor was reconnected to the vacuum line via the open-ended tube of an extra ampoule instead of using the styrene monomer ampoule. The ampoule was then evacuated and heated with a yellow flame periodically for a few hours until a high vacuum was achieved as tested with a Tesia coil. The calculated volume of purified butadiene (40 mL, 28 g, d=0.7 g/mL at −78° C., for $M_n^{calc.}$=3 Kg/mol) was condensed into the ampoule using a dry ice/isopropyl alcohol bath (−78° C.). A liquid $N_2$ Dewar flask was used to cool the liquified butadiene in the ampoule while the ampoule was flame sealed using a hand torch. After the solvent was completely thawed, 5 mL of the modifier (DIDIP) was introduced. Then butadiene monomer was poured immediately into the reactor by breaking the corresponding break-seal. The polymerization was carried in a temperature controlled water bath at ice water bath for 24 hours. After polymerization, the orange-yellowish color of poly(butadienyl)lithium in strong polar solvent was observed. The living polymer was terminated by addition of 10 ml of deoxygenated methanol. The polymer was precipitated into methanol with pre-added 0.5% BHT by weight (of polymer). The polymer was isolated by decantation, and dried in vacuum oven over 2 days.

Characterization: Molecular weights and molecular distributions of polymers were determined by size exclusion chromatography (SEC) using a Waters TM 150-C Plus chromatograph with both a differential refractometer and a Viscotek Model 150R viscosity detector equilibrated at 30° C. Chromatographic separations were effected with a six Phenogel column set (two 500, 1000, two $10^4$ and $10^5$ Å) at a flow rate of 1.0 mL/min in tetrahydrofuran (THF, VWR, HPLC grade). The values of molecular weights and molecular distributions were calculated using the universal calibration method after calibration with polystyrene standards (Polymers Laboratories).

Both $^1$H and $^{13}$C nuclear magnetic resonance (NMR) spectroscopic analyses were carried out using a Varian Gemini-300 spectrometer and polymer concentrations were 20% (wt/wt) in $CDCl_3$. The chemical shifts were referenced to deuterated chloroform chemical shift of 7.27 ppm for $^1$H NMR (300 MHz) and 77.23 ppm for $^{13}$C NMR (75 MHz). The delay time for quantitative $^1$H and $^{13}$C NMR was 6 seconds and the number of transients was 32 and 10000, respectively. Integration of peak areas followed Mochel method.[10]

Example 2

Synthesis of Liquid BR

Liquid polybutadiene rubbers (BR) can be synthesized by many different mechanisms. Among them, living anionic polymerization gives polymers with controlled molecular weight and narrow molecular weight distribution, desired architecture and chain end functionalization, varying microstructure (different vinyl configurations). Thus, anionic polymerization can produce well-defined liquid BR with desired properties.

(A) Synthesis of High Vinyl Liquid BR

High vinyl BR can be produced with Buli as initiator with addition of Lewis bases in hydrocarbon solvents. Particularly, bisperidinoethane (DIDIP) could be used to synthesize polybutadienes containing less than 0.5% 1,4-addition adduct. However, in order to achieve such a high level of vinyl content, restricting conditions, such as high ratio of [DIDIP]/[BuLi] and low temperature, are usually required. In the research, a ratio of [DIDIP]/[BuLi]=6 was used and the polymerization was conducted at relatively high temperature (<20° C.). The vinyl content was 92% as measured by $^1$H NMR technique. The molecular weight determined by SEC was 2.8 Kg/mol with polydispersity of 1.11.

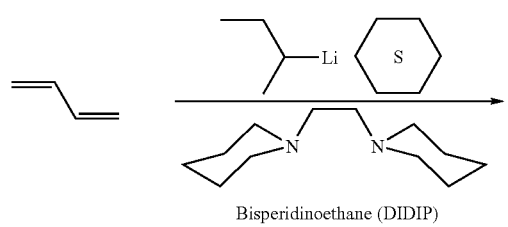

Bisperidinoethane (DIDIP)

-continued

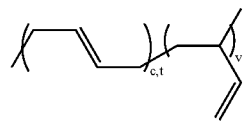

where v represents a vinylic functionality; and
where c,t represents both cis and trans geometric isomers.

(B) Synthesis of 3-Armed Star Branched Liquid BR

One advantage of living anionic polymerization is to produce polymers with different architectures. A 3-armed star BR was synthesized with sec-BuLi as initiator in cyclohexane without addition of any Lewis base. Polymerization of butadiene was conducted as described before. However, the designed molecular weight was about 1 Kg/mol and polymerization temperature was at 40° C. The linking agent was $CH_3SiCl_3$, and was purified twice with $CaC_2$ as drying agent. The desired amount of purified $CH_3SiCl_3$ was distilled into a ampoule equipped with a stopcock and attached onto the reactor. After complete polymerization of 20 hours, the stoichiometrical amount of linking agent was added portionwise at 90%, 5%, 3%, and 2%. The linking efficiency was very high and only a very small amount of unlinked base polymer was present in the final star polymer.

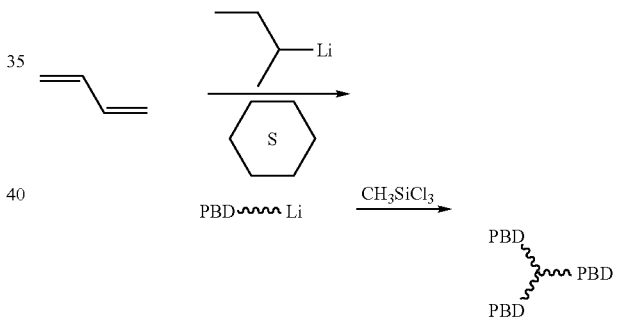

TABLE 1

Polystyryllithium (PS-Li), Polybutadienyllithium (PBD-Li), High-Vinyl Liquid BR (HV-BR), Star Liquid BR (Star-BR) and Functionalized Polymers Such as Epoxidized High-Vinyl Liquid BR (EP-HV-BR) and Epoxidized Star-Branched Liquid BR (EP-S-BR)

| Samples | Vinyl %[a] | $M_n$[b] Kg/mol | PDI[b] | Usage |
|---|---|---|---|---|
| PBD-Li | ~10 | 6.3 | 1.04 | React with epoxidized BR |
| PS-Li | — | 1.8 | 1.11 | React with epoxidized BR |
| HV-BR | 92 | 2.9 | 1.09 | Liquid BR for epoxidation |
| Base | 10 | 1.3 | 1.10 | Base polymer for star formation |
| Star-BR | 10 | 3.9 | 1.02 | Star branched liquid BR |
| EP-HV-BR | | | | |
| EP-S-BR | | | | |

[a]Vinyl and styrene contents were determined by $^1$H NMR.
[b]Both number average molecular weights ($M_n$) and polydispersity index (PDI) were measured by size exclusion chromatograph (SEC). Numbers in parenthesis were the target molecular weights.

Example 3

Hydrolysis of Epoxide Functionalities on Liquid Butadiene Rubber

Epoxide group is relatively reactive, it undergoes many reactions at mild conditions, such as ring open polymerization and transformation to other functional groups as illustrated in Scheme 4. Those reactions may occur during epoxidization. Consequentially, gelation happened as a result of epoxy ring opening and other side reactions from acid, water and other impurities. However, hydrolysis of epoxy rings results in a large number of hydroxy functional groups. The reaction is catalyzed by any acids, but efficiently by Lewis acid with lower acidity. It was reported that bismuth chloride gave a higher yield and less side reactions (i.e. no ring opening reaction occurred).

(A) Hydrolysis of Epoxidized Liquid BR with Bismuth (III) Chloride

Catalytic hydrolysis of epoxidized liquid BR was carried out with bismuth (III) chloride in THF. 4 g of epoxidized liquid BR (equivalent to 40 mmol butadiene ca. was dissolved in a mixture of 200 mL of THF and about 20 mL of $H_2O$. Then 2 g of $BiCl_3$ (Fisher, 98%, 6 mmol) was added. Then mixture was stirred for 4 hours under reflux condition. The reaction mixture was evaporated. The obtained aqueous mixture was saturated brine and extracted with diethyl ether. The combined organic solutions were evaporated. The final polymer was dried overnight in a vacuum oven.

Scheme 4:
General illustration of reactions of epoxide

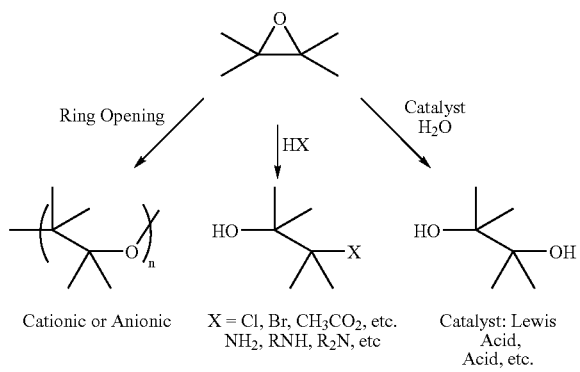

(B) Titration of Hydroxy-Functionalized Liquid BR

The resulting polymer from hydrolysis of epoxidized liquid BR possessed a large number of hydroxy functional groups. The calculated number of hydroxy groups was 50 from proton NMR. The number of hydroxy groups can also be determined by titration method.

In a 100 mL volumetric flask, 5 ml of acetic anhydride (0.0529 mol, d=1.08 g/mL, Fisher, certified) was introduced, and then dried pyridine (Fisher, reagent grade) was added to 100 mL. The solution then was titrated with 0.105 N sodium hydroxide solution. The volumes of NaOH solution used for titrating 5 mL acetic anhydride solutions were 25.8 mL, 25.2 mL and 25.4 mL. The average concentration of acetic anhydride was 0.534 N.

The hydrolyzed liquid BR was thoroughly dried on a vacuum line for 2 days and weighted (0.232 g) into a 250 mL Erlemeyer flask equipped with a magnetic stirring bar and a condenser. Ssyw

Example 4

Polymer Functionalizaion with Epoxidized Liquid BR

It is well known that alkyllithium reacts with epoxide group in a quantitative fashion. This gives a new means of functionalization of alkyllithium-initiated vinyl polymers. Further transformation results a polymer with a large number of functional groups, as demonstrated in Scheme 5. On top of that, using star-branched liquid BR may produce polymers with a dendrimer-like architecture. This reaction stream is illustrated in Scheme 6.

(A) Functionalization of PBD-Li with Epoxidized High Vinyl Liquid BR

Polybutadienyllithium with synthesized in cyclohexane using high vacuum technique. The vacuum dried epoxidized high vinyl liquid BR was dissolved in dried THF in dry box and then the polybutadienyllithium solution was added slowly. The pale yellow color of PBD-Li disappeared immediately upon addition. The reaction was carried at room temperature for one hour for complete reaction. FIG. 1 shows the SEC spectra of HV liquid BR, epoxidized HV liquid BR, polybutadienyllithium, functionalized PBD (one Li per chain) and functionalized PBD (3 Li per chain). The reaction was carried at room temperature for one hour for complete reaction.

(B) Functionalization of PS-Li with Epoxidized High Vinyl Liquid BR

Figure 2:
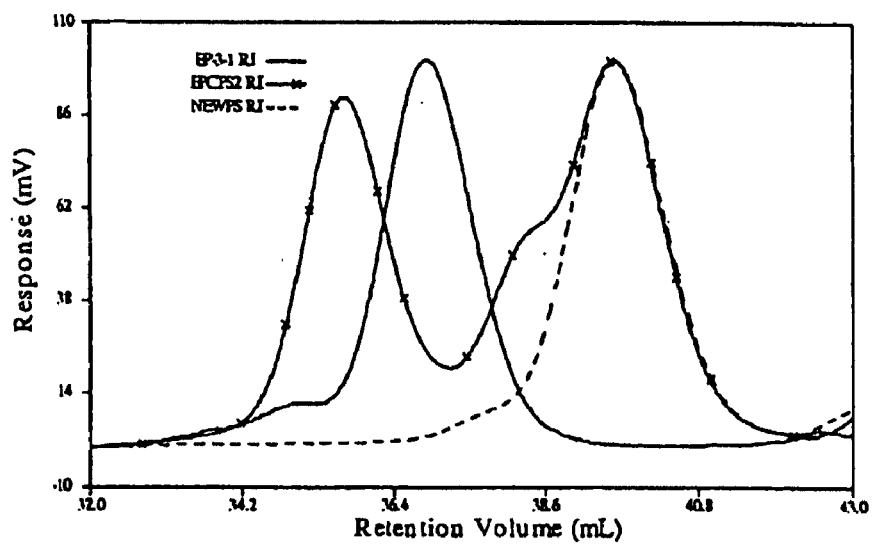
FIG. 2 is an SEC of epoxidized HV liquid BR (—), polystyryllithium (- - -), and PS-Li (excess)/star-EP-BR(X).

Polystyryllithium was used instead of PBD-Li. The reaction proceeded as for PBD-Li, except for that redish color of PS-Li was remained for about half hour. The red color was reestablished by excess PS-Li. FIG. 2 shows the SEC of epoxidized HV liquid BR (—), polystyryllithium (- - -), and PS-Li (excess)/star-EP-BR(X).

(C) Functionalization of PS-Li with Epoxidized Star Branched Liquid BR

Figure 3:
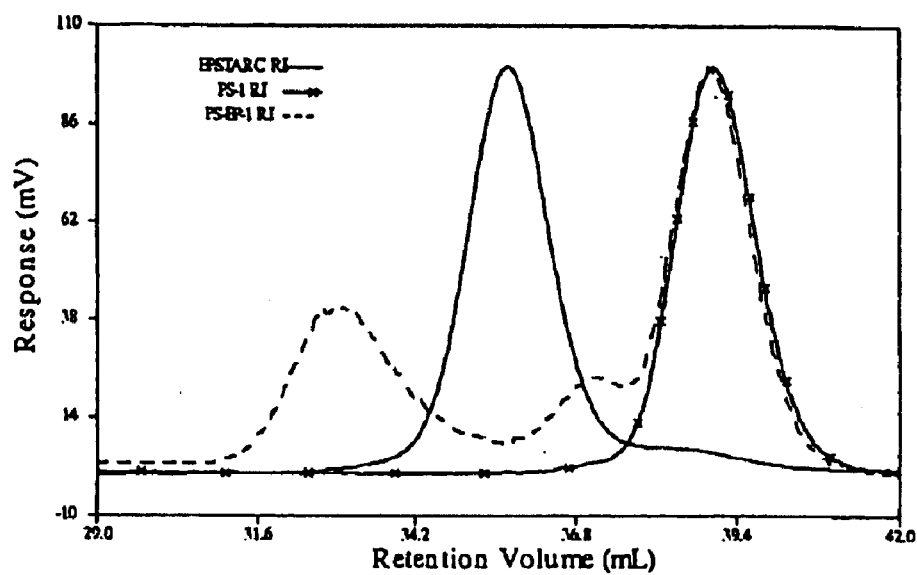
FIG. 3 is an SEC of epoxidized star liquid BR (—), polystyryllithium (- - -), and PS-Li (excess)/EP-BR(X).
Figure 4:
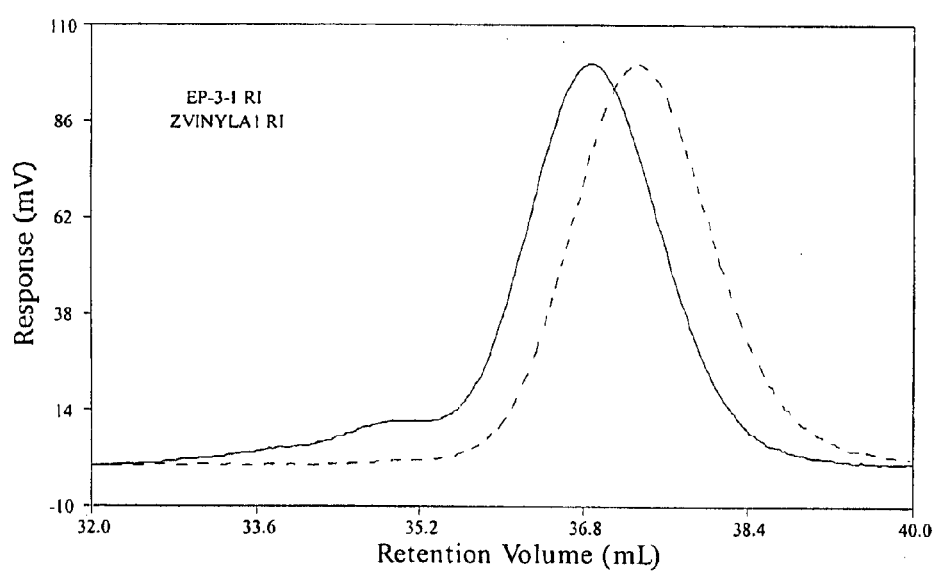
FIG. 4 is an SEC of high vinyl liquid BR(—) and epoxidize with MCPBA for 6 hours.
Figure 5:
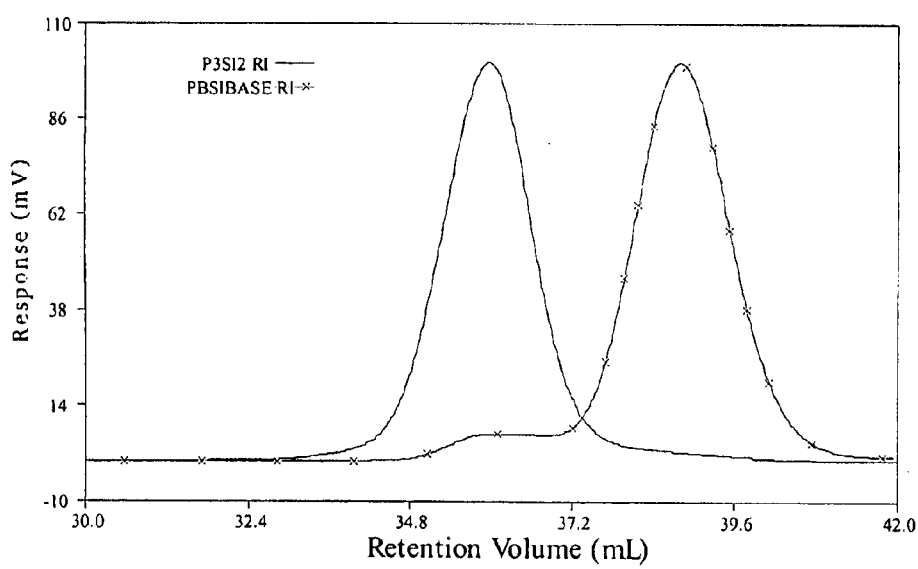
FIG. 5 is an SEC of base polymer (x) and 3-armed star branched liquid BR.

Functionalization of PS was also carried using epoxidized star branched liquid BR. The reaction was carried out as in previous example. The SEC spectra of involved polymers were shown in FIG. 3.

Example 5

Polymer Functionalizaion with Liquid Butadiene Rubber Having Maleic Anhydride Functionalities The (Ma) maleinized liquid BR is commercially available from Ricon Resins Inc; Grand Junction Co. The liquid BR is anionically polymerized first and then maleinized as illustrated in Scheme 7. The sample used in this study possesses 5 maleic anhydride groups per chain, with $M_n$=5.3 Kg/mol and PDI of 1.10. The polymer was dried in vacuum oven overnight to ensure no reactive impurities presented. 0.53 g of maleinized liquid BR (0.1 mmol polymer, 0.5 mmol anhydride) was weighed and dissolved in 200 mL of purified benzene in a dry box. Living polystyryllithium was preprepared under high vacuum conditions, as listed in the following table. The concentration of polystyryllithium was determined as 0.012 M (0.108 g in 5 mL of PS-Li solution). For PS-MaBR-3 sample, 8.4 ml of PS-Li solution was added into 0.53 g of maleinized liquid BR solution. The orange-red color of PS-Li disappeared immediately. For PS-MaBR-1 sample, 75 ml of PS-Li solution was added into another 0.25 g of maleinized liquid BR solution. Initially, the orange-red color of PS-Li disappeared immediately, and remained at the time that about 60 ml of such PS-Li had been added. The solution remained red color for 3 hours before was taken out of the dry box. The reaction was terminated by addition of 10 mL of acidified water in 20 mL of THF. Then the polymer was precipitated into methanol and dried in a vacuum oven for two days.

TABLE 2

Polystyryllithium (PS-Li), Maleinized Liquid BR MaBR and Functionalized Polymers Such as the Reaction Product of PS-Li and MaBR

| Samples | Vinyl %[a] | Styrene %[a] | $M_n$[b] Kg/mol | PDI[b] |
|---|---|---|---|---|
| PS-Li | — | 100 | 1.8 | 1.11 |
| MaBR | 28.2 | 0 | 5.3 | 1.11 |
| PS-MaBR-1 | 28.2 | 87.5 | 4.9 | 8.58 |
| PS-MaBR-3 | 28.2 | 25.3 | 7.0 | 1.51 |

[a]Vinyl and styrene contents were determined by $^1$H NMR.
[b]Both number average molecular weights ($M_n$) and polydispersity index (PDI) were measured by size exclusion chromatograph (SEC). Numbers in parenthesis were the target molecular weights.

TABLE 3

The Polymer Functionalized with Maleinized Liquid BR Using Excess PS-Li

| PS-MaBR-1[a] | $M_n$[b] Kg/mol | $M_w$[b] Kg/mol | $M_z$[b] Kg/mol | PDI[b] | Comments |
|---|---|---|---|---|---|
| Region 1 | 1.8 | 2.0 | 2.1 | 1.11 | PS-Li |
| Region 2 | 31.4 | 88.2 | 350 | 2.88 | 1 MaBR + 15 PS-Li |
| All | 4.9 | 58.0 | 350 | 8.58 | PS-Li (excess) + MaBR |

[a]Vinyl and styrene contents were determined by $^1$H NMR.
[b]Both number average molecular weights ($M_n$) and polydispersity index (PDI) were measured by size exclusion chromatograph (SEC). Numbers in parenthesis were the target molecular weights.

While the best mode and preferred embodiment of the invention have been set forth in accord with the Patent Statues, the scope of this invention is not limited thereto, but rather is defined by the attached claims. Thus, the scope of the invention includes all modifications and variations that may fall within the scope of the claims.

What is claimed is:

1. A method comprising the steps of:
   providing a liquid rubber that has multiple sites of unsaturation;
   chemically modifying the liquid rubbers sites of unsaturation to yield alternate functionalities and thereby create a functionalized liquid rubber; and
   terminating a metallic or organometallic-initiated living polymer with the functionalized liquid rubber.

2. The method of claim 1, wherein said liquid rubber has been synthesized with at least one conjugated diene monomer.

3. The method of claim 1, wherein said liquid rubber is polybutadiene.

4. The method of claim 1, wherein said metallic or organometallic-initiated living polymer is a polymeric organo-lithium.

5. The method of claim 1, wherein said metallic or organometallic-initiated living polymer is poly(styryl) lithium or poly(butadienyl)lithium.

6. The method of claim 1 wherein said alternate functionalities are selected from the group consisting of epoxide, maleic anhydride, and alkoxysilane functional groups.

7. The method of claim 1 further comprising the step of performing hydrolysis on the alternate functionalities to yield hydroxy or carboxy functional groups.

8. The method of claim 1, wherein said liquid rubbers are linear or branched.

\* \* \* \* \*